United States Patent
Braunstein

(10) Patent No.: US 7,664,481 B2
(45) Date of Patent: Feb. 16, 2010

(54) REMOTE PERSONNEL TRACKING

(75) Inventor: Andrew Scott Braunstein, Weston, MA (US)

(73) Assignee: HealthWyse, LLC, Wilmington, MA (US)

( * ) Notice: Subject to any disclaimer, the term of this patent is extended or adjusted under 35 U.S.C. 154(b) by 785 days.

(21) Appl. No.: 11/368,569

(22) Filed: Mar. 6, 2006

(65) Prior Publication Data
US 2007/0207773 A1    Sep. 6, 2007

(51) Int. Cl.
H04M 11/04    (2006.01)
(52) U.S. Cl. .............................. 455/404.2; 379/142.01
(58) Field of Classification Search .................. 455/404
See application file for complete search history.

(56) References Cited

U.S. PATENT DOCUMENTS

| 4,965,459 | A |   | 10/1990 | Murray |
| 5,255,183 | A | * | 10/1993 | Katz ..................... 379/142.05 |
| 5,682,142 | A | * | 10/1997 | Loosmore et al. ........ 340/572.1 |
| 5,901,284 | A |   | 5/1999  | Hamdy-Swink |
| 6,338,140 | B1 |  | 1/2002  | Owens et al. |
| 6,591,242 | B1 | * | 7/2003 | Karp et al. ................ 455/404.2 |
| 6,993,658 | B1 |  | 1/2006 | Engberg et al. |
| 7,477,154 | B2 | * | 1/2009 | Braunstein ............... 340/573.1 |
| 2002/0010865 | A1 | | 1/2002 | Fulton et al. |
| 2004/0083296 | A1 | | 4/2004 | Metral |
| 2005/0021982 | A1 | * | 1/2005 | Popp et al. ................... 713/184 |
| 2005/0177311 | A1 | * | 8/2005 | Thorne ......................... 702/19 |
| 2005/0240418 | A1 | * | 10/2005 | Chappuis ....................... 705/1 |
| 2006/0041746 | A1 | | 2/2006 | Kirkup et al. |
| 2006/0271707 | A1 | * | 11/2006 | Cheline et al. .............. 709/245 |

* cited by examiner

*Primary Examiner*—Curtis Kuntz
*Assistant Examiner*—Maria El-Zoobi
(74) *Attorney, Agent, or Firm*—Holland & Knight LLP; Brian J. Colandreo, Esq.; Seth A. Milman

(57) ABSTRACT

Methods and apparatus, including computer program products, for remote personnel tracking. A computer-implemented method of tracking a field-based employee includes, in a server system, receiving from a remote access device, a user identification (ID) representing the field-based employee, a first series of digits and a location code, generating a second series of digits in response to the received location code, a time representing receipt of the location code, and a remote access device ID associated with the location code, and storing the time and user ID associated with the location ID if the received first series of digits match the second series of digits.

13 Claims, 3 Drawing Sheets

REMOTE PERSONNEL TRACKING

BACKGROUND

The present invention relates to data processing by digital computer, and more particularly to remote personnel tracking.

Significant resources and costs are invested by many businesses to keep track of the whereabouts and/or arrival and departure times of their field-based employees, e.g. nurses, field technicians, delivery and repair personnel or the like, at various work sites such as the homes of patients or the like. One computer-based system for reporting the arrival and departure times of employees requires manual intervention and is inherently prone to being abused. These systems do not provide reliable and instantaneously available reports on the work schedules of field employees, such as would enable businesses to complete the preparation of service bills and invoices much sooner.

Another computer-based system accepts telephone calls for inclusion in a report from telephone locations which are included in a valid Automatic Number Identification (ANI) database. ANI is a service that provides the receiver of a telephone call with the number of the calling phone. The method of providing this information is determined by the service provider (such as AT&T, MCI, Sprint, and so forth). The service is often provided by sending the digital tone multi frequency (DTMF) tones along with the call.

SUMMARY

The present invention provides methods and apparatus, including computer program products, for remote personnel tracking.

In one aspect, the invention features a computer-implemented method of tracking a field-based employee including, in a server system, receiving from a remote access device, a user identification (ID) representing the field-based employee, a first series of digits and a location code, generating a second series of digits in response to the received location code, a time representing receipt of the location code, and a remote access device ID associated with the location code, and storing the time and user ID associated with the location ID if the received first series of digits match the second series of digits.

In embodiments, the remote access device can be selected from the group consisting of a land-line telephone, a wireless telephone, a personal data assistant (PDA) with wireless access, pocket PC with wireless access, and smart phone with wireless access.

The remote access device can include an internal or external security device that generates the first series of digits that can be unique for the remote access device and a minute of a day.

The first series of digits can be a first six-digit number and the second series of digits can be a second six-digit number.

The method can include generating a report from stored time, user ID and location code associated with the remote access device ID.

In another aspect, the invention features a field-based employee tracking system including a remote access device, a server including a processor, a memory including a computer program product being operable to cause the processor to receive from a remote access device, a user identification (ID) representing the field-based employee, a first series of digits and a location code, generate a second series of digits in response to the received location code, a time representing receipt of the location code, and a remote access device ID associated with the location code, and store the time and user ID associated with the location ID if the received first series of digits match the second series of digits.

In embodiments, the remote access device can be selected from the group consisting of a land-line telephone, a wireless telephone, a personal data assistant (PDA) with wireless access, pocket PC with wireless access, and smart phone with wireless access.

The remote access device can include an internal or external security device that generates the first series of digits that can be unique for the remote access device and a minute of a day.

The first series of digits can be a first six-digit number and the second series of digits can be a second six-digit number.

The computer program can be further be operable to cause data processing apparatus to generate a report from stored time, user ID and location information associated with the remote access device ID.

The invention can be implemented to realize one or more of the following advantages.

A system enables tracking the whereabouts, arrival time and departure time of a field-based employee, in a secure fashion.

Tracking of a field-based employee is tamper-resistant. A trusted employee can place a security device in a remote access device. The security device can be secured in the remote access device using, for example, a serial numbered disposable plastic tie, thus preventing undetected tampering.

A system authenticates a user based on entering numeric digits using a touch tone telephone and not a computer network. An answering device at the other end of the phone does equivalent validation, thus providing authentication that the specific device was used and because they are time-synchronized, what time period the authentication was valid for.

A remote security device is not associated with a specific user, but rather a specific location. The security device is mounted and secured at a remote location, so only someone in the presence of that specific security device is able to enter the correct series of digits corresponding to the correct location.

While it is possible that a remote user has an alternate person on site call in for them, an optional second secure device that is user-based can also be used. By requiring that two series of digits be entered, one can enforce a location as well as user validation. Given how rapidly the numbers change, it is highly unlikely that a remote person can provide the numbers to a third party in rapidly enough succession to forge the "signature."

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like

DETAILED DESCRIPTION

Figure 1:
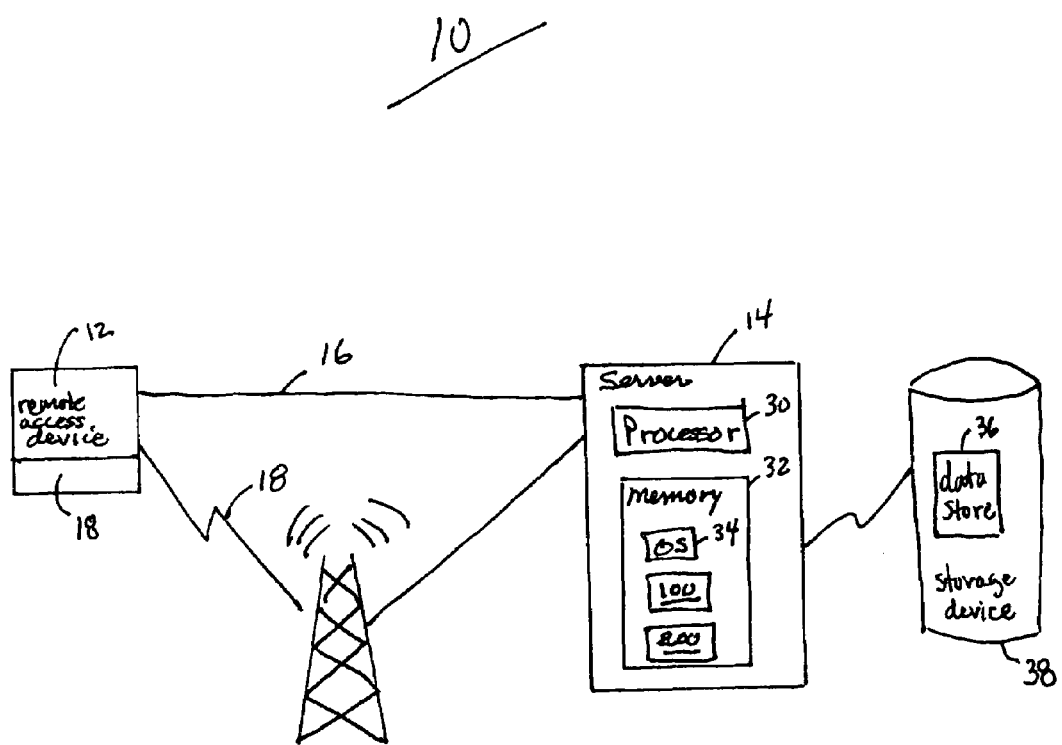
FIG. 1 is a block diagram of an exemplary remote personnel tracking system.

As shown in FIG. 1, an exemplary remote personnel tracking system 10 includes a remote access device 12 linked to a server system 14 over a land line 16 or a wireless link 18. The remote access device 12 can be a land-line telephone, a wireless telephone, personal data assistant (PDA) with wireless access, pocket PC with wireless access, smart phone with wireless access, and so forth. The remote access device 12 includes a security device 18, such as a SecurID FOB from RSA Security, Inc., of Bedford, Mass. The security device 18 is a small and inexpensive device that is affixed either internally or externally to the remote access device 12. The security device 18 generates, for example, a series of digits that are unique for each security device 18 and minute of a day. More specifically, the same security device 18 generates a dissimilar series of digits for a particular time, for a particular device 18, on different dates.

In use, the remote access device 12 is used to log into the server system 14 at the initiation of a visit to a remote site. The user enters a username or user identification (ID), along with a first series of digits generated by the security device 18 on the remote access device 12, and a location ID. The inputted first series of digits and the location ID are used by the server system 14 to validate the security device 18 assigned to the location matches the user's credentials at the time of entry. Synchronization of the security device 18 and server system 14 is not necessary because the server system 14 always has knowledge of which series of digits is being displayed. This same process is repeated at the termination of a remote site visit. The server system 14 knows the location ID from the initiation validation. The user inputs a user ID and a second series of digits generated by the security device 18 on the remote access device 12, which are used by the server system 14 to validate the security device 18 assigned to the location matches the user's credentials at the time of entry.

The server system 14 includes a processor 30 and a memory 32. Memory 32 includes an operating system 34, such as Linux or Windows®, a validation process 100 and a reporting process 200, both described fully below. The server system 14 includes a data store 36. The date store 36 can be implemented, for example, in memory 32 or as a database residing on a storage device 38. The data store 36 includes mappings of security device identifications to expected work site locations and is used by the validation process 100.

The remote personnel tracking system 10 is used to keep track of the whereabouts and/or arrival and departure times of field-based employees, e.g. nurses, field technicians, delivery and repair personnel or the like, at various work sites, such as the homes of patients or the like. In such cases, the security device 18 is positioned in or affixed to remote access device 12 at a work site of interest. For example, the security device 18 can be added to a telephone in a patient's home. In this manner, the security device 18 is not associated with a specific field-based employee, but rather a specific location.

In one particular example, the security device 18 is placed in the remote access device 12 by a trusted employee prior to any use. The trusted employee can secure the security device 18 in the remote access device 12 using, for example, a serial numbered disposable plastic tie. In general, a serial numbered disposable plastic tie is an irremovable plastic tie, such as used to bind cables together, stamped with a serial number so if it is cut and removed it can not be replaced without noticing. A similar type device is used by the electric and gas companies to secure meters.

Each field-based employee is assigned a unique user identification (ID) and such service location assigned a location code or location identification (ID). When a field-based employee is dispatched, upon arriving at the site the employee initiates a telephone call to the server system 14 using the remote access device 12 having the security device 18 positioned therein. When the call is answered, the field-based employee enters their unique user ID, a location code or location identification (ID) and a first series of digits generated by the security device 18 that is displayed on the remote access device 12. The validation process 100, knowing the location, time of day and the remote access device 12, can generate a second series of digits to determine whether the first series of digits received from the remote access device 12 matches the second series of digits generated by the server system 14. If the two series of digits match, the validation process 100 records a valid user ID at the particular time for the particular site location with the server system 14.

This same sequence of events can occur as the field-based employee is ready to leave the remote site at the end of a visit. The field-based employee initiates a telephone call to the server system 14 using the remote access device 12 having the security device 18 positioned therein. When the call is answered, the field-based employee enters their user ID and a first series of digits generated by the security device 18 that is displayed on the remote access device 12. The validation process 100, knowing the location (from the initial prior call), time of day and the remote access device 12, can generate a second series of digits to determine whether the first series of digits received from the remote access device 12 matches the second series of digits generated by the server system 14. If the two series of digits match, the validation process 100 records a valid user ID at the particular time for the particular job site location with the server system 14. The server system 14 now has a record of a start and an end time of the field-based employee at a specific location, which can be stored for use by the reporting process 200.

At periodic times that are administrator-customizable, such as once a day, once a week, or once a month, an administrator can initiate the reporting process 200. The reporting process 200 can be customized to generate one or more reports using data representing one or more field-based employees with respect to remote site visits. From data stored at the server system 14, the reporting process 200 can correlate dates and times against scheduled visits. The stored data can insure that the field-based employee has been to the remote site where he or she has been prescheduled to appear. Alternatively, information that a certain field-based employee has appeared at other than the pre-designated location can be relayed immediately to an employer to whom receipt of such information might be valuable.

The data can be stored in a database and can then be forwarded to subscribers or users as hard copy output, electronically (e.g., email), and/or through a direct computer connection to server system 14 (e.g., secure web site). The reports can be sent, for example, asynchronously, synchronously or through Wide Area Networks (WANs).

Figure 2:
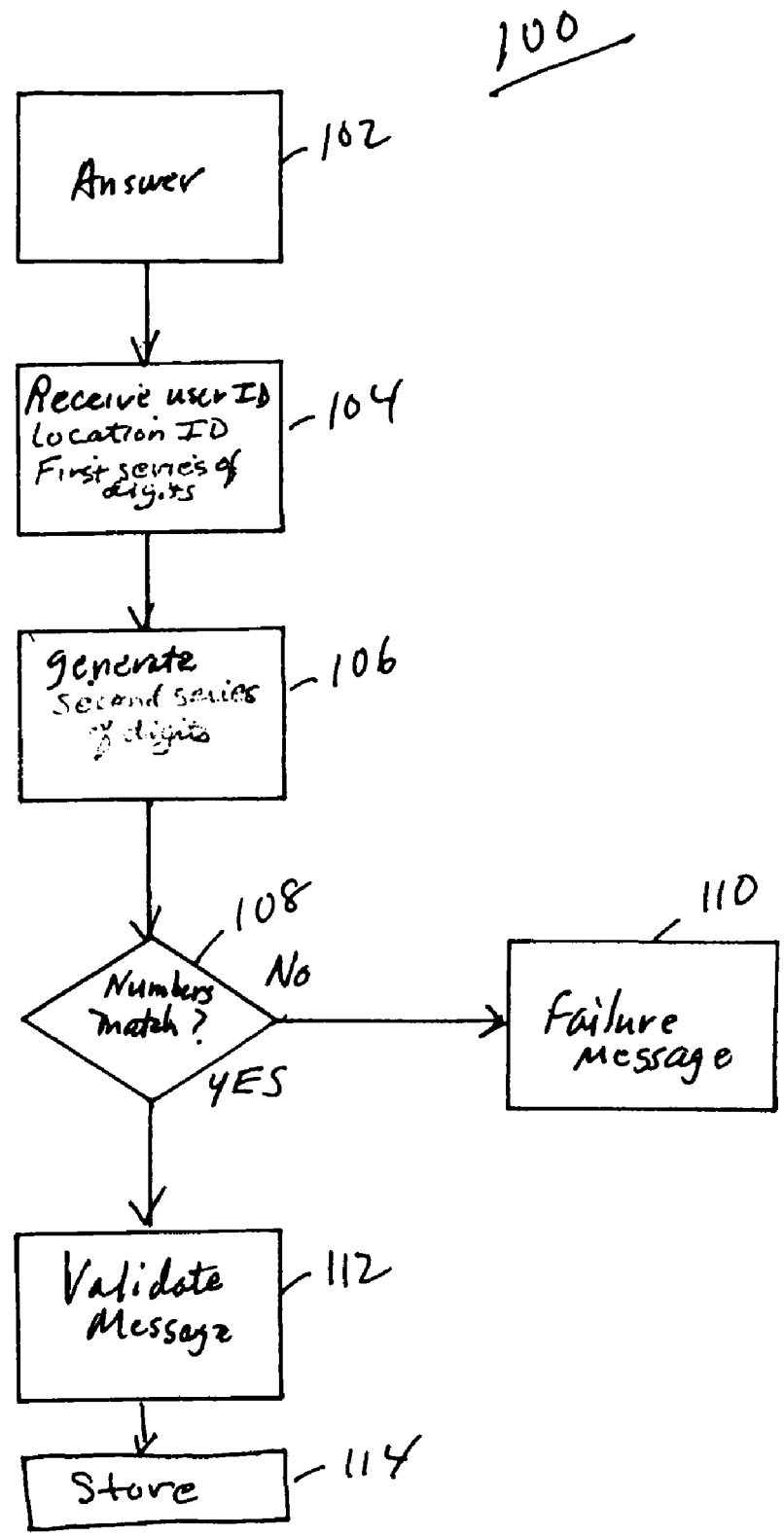
FIG. 2 is a flow diagram.

As shown in FIG. 2, process 100 includes answering (102) a telephone call from a remote access device, such as, for example, a land-line telephone, a wireless telephone, personal data assistant (PDA) with wireless access, pocket PC, or smart phone. Process 100 receives (104) a user ID, a location code and a first series of digits. The received first series of digits represents a number generated by a security device installed in the remote access device and entered by a user. Knowing the location code, user ID and time of day the first series of digits were generated by the security device, process 100 generates (106) a second series of digits. Process 100 determines (108) whether the first series of digits matches the second series of digits. If they fail to match, process 100 generates (110) a failure message to the remote access device. If they match, process 100 generates (112) a validation message and stores (114) the received user ID, time, and location in for example, a database. This data is stored for later use in developing reports and to insure that the field-based employee associated with the user ID has been to the remote site where he or she has been prescheduled to appear. The reports can be viewed by a subscriber or emailed to a designated user address. Alternatively, information that a certain field-based employee has appeared at other than the pre-designated location can be relayed via email, for example, to an employer to whom receipt of such information might be valuable.

Figure 3:
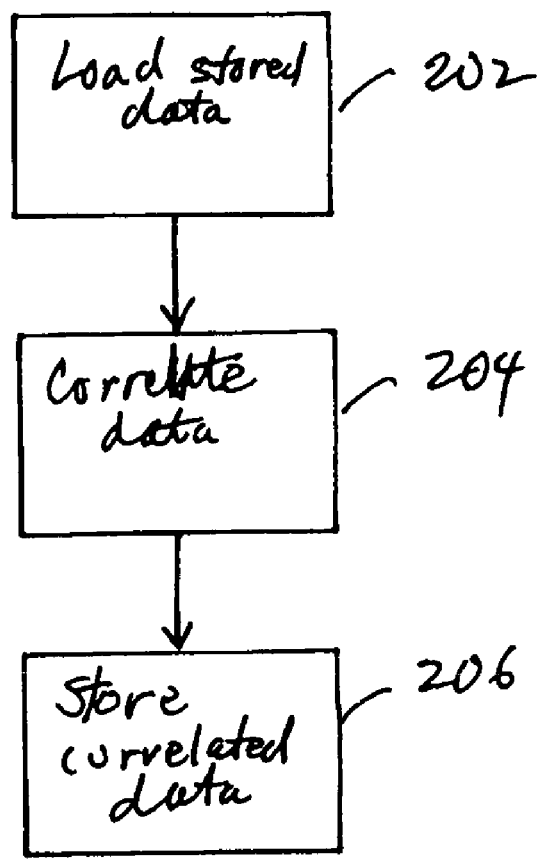
FIG. 3 is a flow diagram.

As shown in FIG. 3, process 200 includes loading (202) stored data representing user, date, time, and location information stored by the validation process 100. Process 200 correlates (204) date and time data against scheduled visits for each field-based employee ID. Process 200 stores (206) the correlated data for later use in developing reports and to insure that the field-based employee associated with the user ID has been to the remote site where he or she has been prescheduled to appear. The reports can be viewed by a subscriber or emailed to a designated user address.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method of tracking a field-based employee comprising:
    associating, by a server system, a security device with a service location, the security device configured to periodically generate a unique series of digits;
    assigning, by the server system, a location identification code to the service location;
    receiving data, by the server system, the data comprising:
        a user identification representing the field-based employee,
        a first series of digits generated by the security device, and
        the location identification code assigned to the service location;
    generating, by the server system, a second series of digits based upon, at least in part:
        the received user identification,
        the received location identification code, and
        a time of receipt of the user identification, the location identification code, and the first series of digits;
    comparing, by the server system, the first series of digits and the second series of digits; and
    if the first series of digits and the second series of digits match, validating, by the server system, that the field-based employee was at the service location at the time of receipt.

2. The computer-implemented method of claim 1 wherein the security device generates a unique series of digits every minute.

3. The computer-implemented method of claim 1 wherein the first series of digits is a six-digit number and the second series of digits is a six-digit number.

4. The computer-implemented method of claim 1 further comprising generating a report including the time of receipt, user identification, and location information code received by the server system.

5. A computer program product, tangibly embodied in an information carrier, for tracking a field-based employee, the computer program product being operable to cause data processing apparatus to:
    associate a security device with a service location, the security device configured to periodically generate a unique series of digits;
    assign a location identification code to the service location;
    receive data from a remote access device, the data comprising:
        a user identification representing the field-based employee,
        a first series of digits generated by the security device, and
        the location code assigned to the service location;
    generate a second series of digits based upon, at least in part:
        the received user identification,
        the received location identification code, and
        a time of receipt of the user identification, location identification code, and the first series of digits;
    compare the first series of digits and the second series of digits; and
    if the first series of digits and the second series of digits match, validate that the field-based employee was at the service location at the time of receipt.

6. The computer program product of claim 5 wherein the security device generates a unique series of digits every minute.

7. The computer program product of claim 5 wherein the first series of digits is a six-digit number and the second series of digits is a six-digit number.

8. The computer program product of claim 5 further operable to cause data processing apparatus to:
generate a report including the time of receipt, user identification, and location information code received by the data processing apparatus.

9. A field-based employee tracking system comprising:
a remote access device;
a security device configured to periodically generate a unique series of digits; and
a server system comprising:
a processor; and
a memory including a computer program product being operable to cause the processor to:
associate the security device with a service location;
assign a location identification code to the service location;
receive data from a remote access device, the data comprising:
a user identification representing the field-based employee,
a first series of digits generated by the security device, and
the location identification code assigned to the service location;
generate a second series of digits based upon, at least in part:
the received user identification,
the received location identification code, and
a time of receipt of the user identification, location code, and a remote access device ID associated with the location code; and
store the time and user ID associated with the location ID if the received first series of digits match the second series of digits.

10. The system of claim 9 wherein the remote access device is selected from the group consisting of:
a land-line telephone,
a wireless telephone,
a personal data assistant (PDA) with wireless access,
a pocket PC with wireless access, and
a smart phone with wireless access.

11. The system of claim 9 wherein the remote access device comprises an internal or external security device that generates the first series of digits that is unique for the remote access device and a minute of a day.

12. The system of claim 9 wherein the first series of digits is a six-digit number and the second series of digits is a six-digit number.

13. The system of claim 9 wherein the computer program is further operable to cause data processing apparatus to:
generate a report from stored time, user ID, and location information associated with the remote access device ID.

* * * * *